United States Patent [19]
Peirano et al.

[11] 3,733,957
[45] May 22, 1973

[54] MUSIC TEACHING DEVICE

[76] Inventors: Mary Anne Peirano; John F. Peirano, both of 1109 St. Agnes Avenue, Columbus, Ohio 43204

[22] Filed: July 10, 1972

[21] Appl. No.: 270,091

[52] U.S. Cl. ................................................84/471
[51] Int. Cl. .............................................G09b 15/02
[58] Field of Search.........................84/471–475

[56] References Cited

UNITED STATES PATENTS

| | | | |
|---|---|---|---|
| 1,353,486 | 9/1920 | McOurt | 84/471 |
| 1,384,179 | 7/1921 | Von Rague | 84/471 |
| 1,412,587 | 4/1922 | Willoughby | 84/471 |

Primary Examiner—Richard B. Wilkinson
Assistant Examiner—Lawrence R. Franklin
Attorney—William V. Miller et al.

[57] ABSTRACT

A teaching device for music is provided having a flat baseboard formed with a plurality of recesses and a like number of music symbol devices that are each removably insertible into a respective recess. The recess in the baseboard and the devices are configured so that each device will only cooperatively interfit with a respective recess. The recesses are of a predetermined depth with the devices being of a thickness as to project a distance outwardly from the surface of the baseboard to facilitate removal after insertion in a respective recess. Arrangement of the recesses or configuration thereof and the devices form a musical notation system to aid in the teaching process.

6 Claims, 4 Drawing Figures

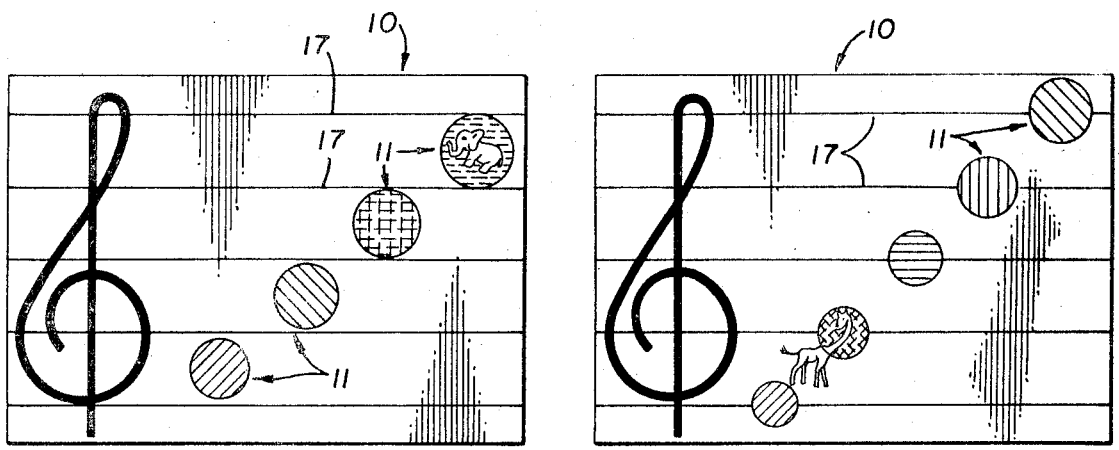
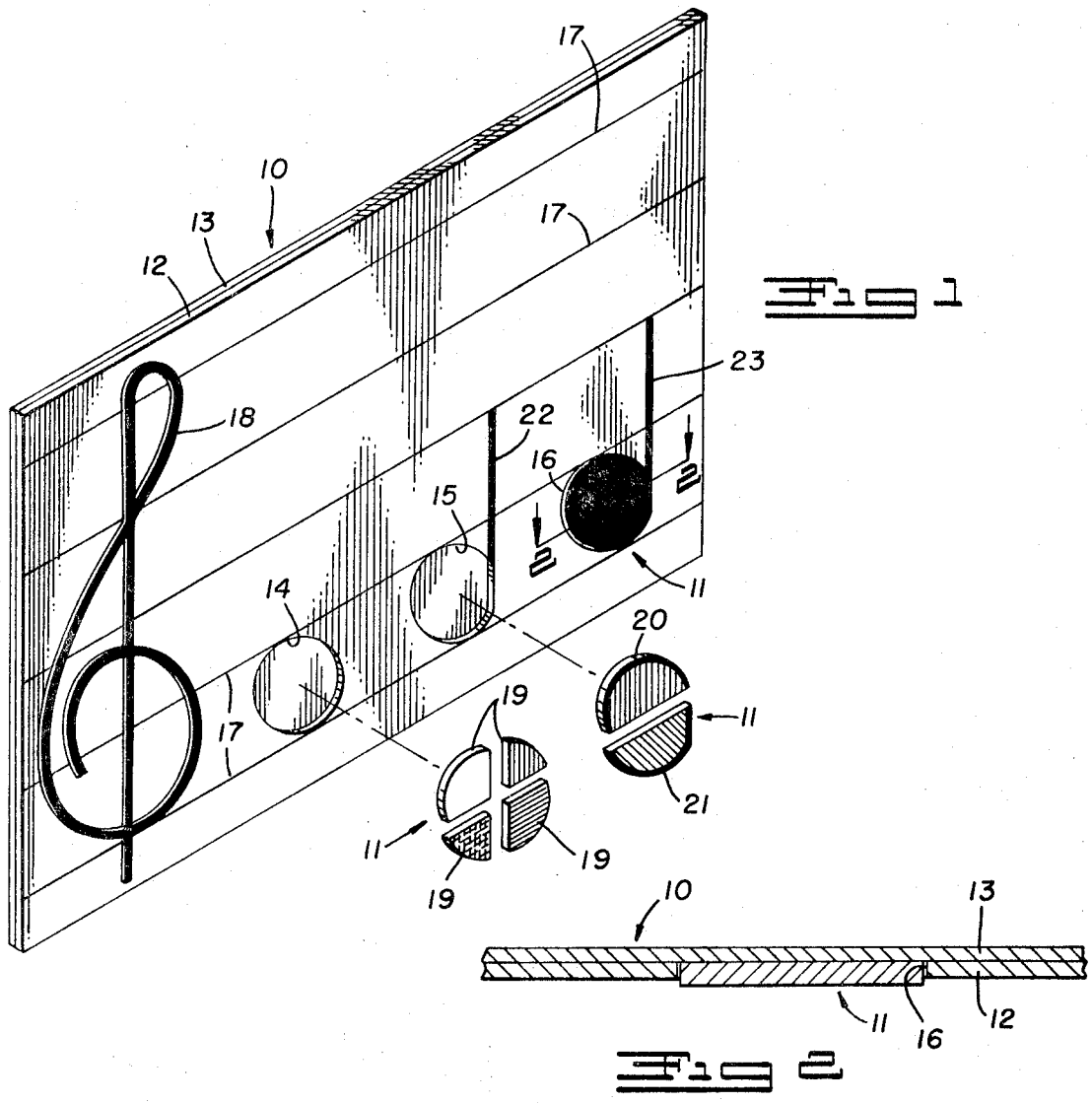

MUSIC TEACHING DEVICE

BRIEF DESCRIPTION OF THE INVENTION

The teaching device of this invention is primarily designed to aid and facilitate teaching of music to relatively young children, such as in the age group of two through ten years. While the primary function is to aid and facilitate teaching, the devices of this invention are constructed and arranged to evoke and retain the child's interest during the learning process. In view of directing the invention toward this age group, it is preferred that the scope of any particular lesson plan be limited to an area that may be comprehended by a selected age group. This is readily accomplished by providing a multiplicity of teaching devices constructed in accordance with this invention with each device directed to only a relatively small segment of music instruction with a set of the devices forming a complete basic course in music.

A basic embodiment of the device as illustrated and described in detail hereinafter is directed to instruction as to the basic musical notation system. That is the musical staff is illustrated with the instructual content being the indentification of the primary musical notes. A second illustrative embodiment of invention provides instruction as to the musical beat or time system. In each of the embodiments, the student learns through the process of physically manipulating devices which symbolically represent the notes and places them on a baseboard which provides a relationship of the notes to the musical staff. The baseboard and symbol devices are constructed so that a specific device may only interfit properly with a respective recess formed in the board for that device. The physical limiting of the placement of the devices relative to the board aids in the learning process through limiting the placement to only the correct position or relationship of the notes to the musical scale. Since the instructional value of the device resides in the insertion of the devices into the proper recess in the baseboard, the recesses are configured to cooperatively interfit only with a respective device with the devices, when inserted, projecting from the surface of the board for subsequent removal and repeat of the specific lesson.

These and other objects and advantages of this invention will be readily apparent from the following detailed description of embodiments of the invention, and from the accompanying drawings.

DESCRIPTION OF THE DRAWING FIGURES

FIG. 1 is a perspective view of an embodiment of the invention with some of the musical symbol devices shown removed from the baseboard.

FIG. 2 is a horizontal sectional view on an enlarged scale taken along line 2—2 of FIG. 1.

FIG. 3 is a plan view of a modification of the invention.

FIG. 4 is a plan view of a further modification of the invention similar to that shown in FIG. 3.

DETAILED DESCRIPTION OF THE INVENTION EMBODIMENTS

The three embodiments of the invention illustrated in the drawing are fabricated and constructed in substantially the same manner with the only difference being in the arrangement or type of musical symbol device that forms the lesson for that particular embodiment. Accordingly, reference is first made to FIG. 1, which better visually illustrates the invention.

Each teaching device according to this invention comprises as its basic elements; a flat baseboard 10 and a plurality of musical symbol devices 11. The baseboard 10 is of a sheet form, rectangular shape preferrably having a greater dimension in length than in height. Construction of the baseboard may utilize wood, cardboard, or other suitable hard board providing the necessary structural rigidity and durability. In the illustrated embodiment of FIG. 1 two sheets of material 12 and 13 are cut to similar dimensions and adhesively bonded together to form a baseboard of unitary construction. One of the sheets, 12 in the illustrative embodiment, is formed with a plurality of apertures 14, 15, and 16 that are of relatively different peripheral configurations. It will be seen that each of the apertures in sheet 12 becomes a closed-bottom recess of predetermined depth in the assembled baseboard structure.

Since this particular embodiment is designed to illustrate and teach the concept of musical time or beat, the three apertures 14, 15 and 16 are merely formed in a longitudinal alignment without particular reference to a musical staff that is also illustrated. In order to better provide a basis for the concept of a music notation system, a music staff is drawn on the surface of the sheet 12 and is respresented by the five lines 17 with the apertures formed between two lines. As a further improvement in illustrating this basic music concept, the baseboard may be provided with a clef symbol 18 which may either be printed on the baseboard as the staff lines 17 or formed as a removable device inserted in an appropriately configured recess as is illustrated.

Each music symbol device 11 is also formed from a suitable material such as wood or hardboard to provide the necessary structural rigidity and durability. Each device, in addition to having a peripheral configuration or dimension to cooperatively interfit with a respective recess or aperture 14, 15 or 16, is formed to have a thickness substantially greater than the depth of the recess. This is clearly shown in FIG. 2 where the device 11 can be seen to project a distance outwardly from the front surface of the baseboard thereby permitting a child to readily grip the device for removal.

The three devices 11 illustrated in FIG. 1 represent the whole, half, and quarter notes and serve to demonstrate the basic music time system or beat. The whole note device 11 shown at the left of FIG. 1 comprises four separate units or elements 19 that are of a similar configuration which combine to form a composite device symbolizing a whole note. If desired, each of the elements 19 may have a different surface ornamentation or, as is illustrated, color to further aid in the learning process.

The device 11 appearing in the middle of the three devices represents a half note formed by two elements 20 and 21 which combine with a vertical bar 22 that is printed on the surface of the sheet 12. The two elements 20 and 21 are similarly configured that combine to form a composite device 11 symbolizing the quarter note comprises a single element that is positionable in the recess 16, and combines with a second vertical bar 23 printed on the baseboard to form the quarter note symbol. The elements 20 and 21 forming the half note symbol may be colored to provide an outer periphal ring with a different colored central portion. The surface of device 11 for a quarter note will be of a single color.

Since the device of this invention is intended for relatively young children, and so a further aid in the teaching process, the apertures 14, 15 and 16 as well as the respective devices that are to interfit therein are of different periphal configuration or dimension to prevent an erroneous device from being placed in a particular recess or to indicate that a device has been erroneously placed. Accordingly, the three recesses 14, 15, and 16 are of a circular configuration with incrementally different diameters with the recesses 15 and 16 being sequentially and progressively larger in diameter. As for example, the diameter of the aperture 15 may be larger than the diameter of aperture 14 by one-sixteenths with aperture 16 then being larger than 15 by a similar increment. Both of the devices 11 forming the half and quarter notes have a flattened side configuration further distinguishing the whole note to indicate that they should not be placed in the recess 14 for a whole note. The dimensional difference will prevent the half and quarter notes from being interfitted in recess 14.

While the staff lines 17 and the vertical bars 22 and 23 are shown as printed on the surface of the baseboard 10, it will be understood that these elements may also be removable devices as illustrated with respect to the clef 18. In each case, the baseboard 10 would be formed with slat-form recesses to receive similarly dimensioned, elongated, strip-form devices. Other musical notation symbols may be provided in combination with the illustrative baseboard or with a separate or other baseboard with such symbols being either of the printed type or as removable devices positionable in their respective recesses.

FIGS. 3 and 4 illustrated modified forms of the teaching devices that are constructed to provide reference in teaching with respect to the notes in the musical scale. The two modified forms illustrated in thses two figures are complementary in that each covers only a portion of a musical scale but, when combined, will complete a full scale. Each of the devices illustrated in FIGS. 3 and 4 will be constructed in a manner similar to that illustrated in detail with respect to FIG. 1. As such, each will include a baseboard 10 having a musical staff and a clef printed on the surface thereof and formed with a plurality of recesses into which respective musical symbol devices 11 will cooperatively interfit. In this case each of the musical devices symbolically represents a whole note as it is not intended to combine this concept with the musical beat or time. The recesses are formed in offset relationship to each other in an upwardly inclined line to provide a reference to time spacing of the notes. In FIG. 3 the recesses are formed between the staff lines, whereas in FIG. 4 the notes or recesses are placed on the lines.

In each case, however, the recesses and devices are of a progressively increasing diameter from the lowermost recess and device. As indicated with reference to FIG. 1 this dimensional difference may be in the order of one-sixteenths or less, such as one thirty-seconds, to provide a necessary dimensional difference to either prevent interfitting of a device in a particular recess or indicate to the child that he is attempting to place a musical symbol device in the wrong recess.

As a further aid in the teaching process each of the musical symbol devices 11 provided with devices shown in FIGS. 3 and 4 may be provided with different colors or symbolic elements to give an indication of the name of a particular note. The uppermost note in FIG. 3 is not only provided with a particular color, but is given an animal character signifying the note. In that instance the animal character is placed entirely within the periphery of the musical symbol device 11. As seen in FIG. 4 the animal character is divided into two portions with one portion being printed on the surface of the baseboard 10, and combines in an appropriate manner with the part of the character printed on the device to form a composite animal character.

The embodiments illustrated in the several Figures of the drawing are designed to demonstrate and teach the most basic part of musical concepts. It will be readily apparent that other symbols and devices may be utilized in conjunction with the baseboard having suitably formed recesses. For example, a bass clef sign may be utilized in place of the treble clef and the musical scale may be extended beyond the confines of the staff itself through expansion of the baseboard to have spaces or lines above or below the staff leaving room for insertion and combination of notes illustrating the extension of the musical scale to include other octaves. Musical notation symbols other than the clef signs may be provided such as the sharps and flats to provide a teaching aid with respect to these concepts. In each instance; however, the musical symbol device would be of a thickness to project a distance from the surface of the baseboard 10 to enable and facilitate its removal and insertion. It will also be apparent that the illustrated devices 11 designating the notes are of a circular configuration for convenience of fabrication, but these devices may be of the conventional oblong configuration as so desired.

It will be readily apparent that a novel musical teaching device is provided which is particularly useful with respect to teaching of a relatively young age group of children. The utilization of musical symbol devices, that are removably insertible in respective recesses formed in a baseboard, results in greater interest in learning basic musical concepts by such a young age group. The use of differently configured or sized devices materially aids the learning process through immediate indication of errors.

Having thus described this invention, what is claimed is:

1. A music teaching device comprising
   a flat baseboard having a plurality of recesses of predetermined depth formed therein, each recess opening at a front surface of said baseboard and of a peripheral configuration dissimilar to each other recess, and
   a plurality of musical symbol devices each removably positionable in a respective recess and of a thickness greater than the recess depth to project a distance outwardly from the surface of the board when assembled therewith whereby the device may be manually gripped for removal, each of said devices being configured to cooperatively interfit with a respective one of said recesses.

2. A music teaching device according to claim 1 wherein at least one of said musical symbol devices is formed from a plurality of relatively separable elements.

3. A music teaching device according to claim 1 wherein said plurality of musical symbol devices and recesses are all of the same geometrical shape but of dissimilar dimensions differing by predetermined increments.

4. A music teaching device according to claim 3 wherein said recesses are formed in said baseboard in a sequential arrangement with the recesses being progressively different.

5. A music teaching device according to claim 1 wherein at least two of said musical symbol devices and respective recesses are of different geometrical configuration.

6. A music teaching device according to claim 5 wherein said different configured devices and respective recesses are of different dimensions.

* * * * *